United States Patent
Iwasaki et al.

(10) Patent No.: US 11,726,869 B2
(45) Date of Patent: Aug. 15, 2023

(54) PERFORMING ERROR CONTROL OPERATION ON MEMORY COMPONENT FOR GARBAGE COLLECTION

(71) Applicant: Micron Technology, Inc., Boise, ID (US)

(72) Inventors: Tomoko Ogura Iwasaki, San Jose, CA (US); Avani F. Trivedi, Eagle, ID (US); Jianmin Huang, San Carlos, CA (US); Aparna U. Limaye, Boise, ID (US); Tracy D. Evans, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/995,334

(22) Filed: Aug. 17, 2020

(65) Prior Publication Data
US 2021/0055990 A1 Feb. 25, 2021

Related U.S. Application Data

(60) Provisional application No. 62/889,280, filed on Aug. 20, 2019.

(51) Int. Cl.
*G06F 11/10* (2006.01)
*G06F 11/07* (2006.01)
(Continued)

(52) U.S. Cl.
CPC ...... *G06F 11/1068* (2013.01); *G06F 11/0772* (2013.01); *G06F 11/203* (2013.01);
(Continued)

(58) Field of Classification Search
CPC ............. G06F 11/1068; G06F 11/0772; G06F 11/203; G06F 11/3037; G06F 12/0246;
(Continued)

(56) References Cited

U.S. PATENT DOCUMENTS

| 5,127,014 A | 6/1992 | Raynham |
| 7,688,614 B2 | 3/2010 | Morimoto |

(Continued)

FOREIGN PATENT DOCUMENTS

| JP | 2010244342 A | 10/2010 |
| KR | 1020090053901 A | 5/2009 |

(Continued)

OTHER PUBLICATIONS

PCT Notification of the International Search Report and the Written Opinion of the International Searching Authority for PCT Application No. PCT/US2020/047074, dated Nov. 20, 2020, 9 pages.

(Continued)

*Primary Examiner* — James C Kerveros
(74) *Attorney, Agent, or Firm* — Lowenstein Sandler LLP

(57) ABSTRACT

Systems, apparatuses, and methods related to media management, including "garbage collection," in memory or storage systems or sub-systems, such as solid state drives, are described. For example, a signaling can be received that indicates a request from a controller to migrate valid data from a first data block to a second data block. For example, the first data block can be a data block of a plurality of memory cells configured as single-level-cell (SLC) memory. The second data block can be configured as multi-level-cell (MLC) memory. The data migration operation can include an error control operation that is performed using the memory component, the error control operation excluding transferring the data to the controller. The data can be migrated from the first data block configured as SLC memory to the second data block configured as MLC memory after the error control operation is performed using the memory component.

20 Claims, 5 Drawing Sheets

(51) Int. Cl.
    *G06F 11/30*       (2006.01)
    *G06F 12/02*       (2006.01)
    *G06F 11/20*       (2006.01)

(52) U.S. Cl.
    CPC ...... *G06F 11/3037* (2013.01); *G06F 12/0246* (2013.01); *G06F 12/0253* (2013.01); *G06F 2212/7209* (2013.01)

(58) Field of Classification Search
    CPC ......... G06F 12/0253; G06F 2212/7209; G06F 11/1072; G06F 2212/1024; G06F 2212/1028; G06F 2212/1032; G06F 2212/7203; G06F 2212/7205; Y02D 10/00
    USPC .......................................................... 714/764
    See application file for complete search history.

(56) References Cited

U.S. PATENT DOCUMENTS

| | | | |
|---|---|---|---|
| 9,514,057 B2 | 12/2016 | Marcu et al. | |
| 10,761,728 B2 | 9/2020 | Hong et al. | |
| 10,853,243 B2 | 12/2020 | Davis | |
| 11,282,567 B2 | 3/2022 | Iwasaki et al. | |
| 2005/0144357 A1 | 6/2005 | Sinclair | |
| 2005/0144365 A1 | 6/2005 | Gorobets et al. | |
| 2005/0144516 A1 | 6/2005 | Gonzalez et al. | |
| 2006/0136687 A1 | 6/2006 | Conley | |
| 2007/0174579 A1 | 7/2007 | Shin | |
| 2007/0237003 A1 | 10/2007 | Melik-Martirosian et al. | |
| 2008/0229000 A1 | 9/2008 | Kim | |
| 2009/0073771 A1 | 3/2009 | Li | |
| 2009/0319720 A1 | 12/2009 | Stefanus et al. | |
| 2011/0161567 A1 | 6/2011 | Song | |
| 2013/0046920 A1* | 2/2013 | Ryu .................... G06F 12/0246 711/103 |
| 2013/0055047 A1 | 2/2013 | Sharon et al. | |
| 2013/0339572 A1 | 12/2013 | Fanning | |
| 2014/0032817 A1 | 1/2014 | Bux et al. | |
| 2014/0101372 A1* | 4/2014 | Jung .................... G06F 11/1068 711/103 |
| 2014/0204672 A1 | 7/2014 | Lee et al. | |
| 2015/0154118 A1 | 6/2015 | Marcu et al. | |
| 2015/0205539 A1 | 7/2015 | Moon et al. | |
| 2016/0011971 A1 | 1/2016 | Lee et al. | |
| 2016/0026526 A1 | 1/2016 | Zhang et al. | |
| 2016/0092128 A1* | 3/2016 | Jain ....................... G06F 3/0688 711/103 |
| 2016/0179386 A1 | 6/2016 | Zhang | |
| 2017/0046256 A1 | 2/2017 | Horspool et al. | |
| 2017/0242625 A1 | 8/2017 | Pandurangan et al. | |
| 2017/0249969 A1 | 8/2017 | Aiello et al. | |
| 2018/0024779 A1 | 1/2018 | Kojima | |
| 2018/0059934 A1 | 3/2018 | Lee et al. | |
| 2018/0189175 A1 | 7/2018 | Yi et al. | |
| 2018/0314579 A1 | 11/2018 | Sampayo et al. | |
| 2019/0095323 A1 | 3/2019 | Gidra | |
| 2019/0163622 A1 | 5/2019 | Wu | |
| 2019/0179569 A1 | 6/2019 | Yang | |
| 2019/0303253 A1* | 10/2019 | Shin .................... G06F 11/1068 |
| 2020/0042230 A1 | 2/2020 | Li | |
| 2020/0042438 A1 | 2/2020 | Yi et al. | |
| 2020/0073571 A1 | 3/2020 | Chen et al. | |
| 2020/0073573 A1 | 3/2020 | Park | |
| 2020/0089608 A1 | 3/2020 | Chou et al. | |
| 2020/0110537 A1 | 4/2020 | Hahn et al. | |
| 2020/0110706 A1 | 4/2020 | Takeuchi | |
| 2020/0117559 A1 | 4/2020 | Park | |
| 2020/0133572 A1 | 4/2020 | Park | |
| 2020/0174700 A1 | 6/2020 | Seong | |
| 2020/0409559 A1 | 12/2020 | Sharon et al. | |
| 2021/0034273 A1 | 2/2021 | Pemeti et al. | |
| 2021/0042201 A1 | 2/2021 | Byun | |
| 2022/0083223 A1 | 3/2022 | Choi et al. | |
| 2022/0188234 A1 | 6/2022 | Na | |

FOREIGN PATENT DOCUMENTS

| | | |
|---|---|---|
| KR | 1020100122720 A | 11/2010 |
| KR | 1020140116617 A | 10/2014 |

OTHER PUBLICATIONS

International Search Report and Written Opinion for International Application No. PCT/US2020/047263 dated Nov. 20, 2020, 11 pages.

International Search Report and Written Opinion for International Application No. PCT/US2020/047075, dated Nov. 20, 2020, 10 pages.

International Search Report and Written Opinion for International Application No. PCT/US2020/048393, dated Nov. 25, 2020, 10 pages.

International Search Report and Written Opinion for International Application No. PCT/US2020/047260, dated Nov. 25, 2020, 10 pages.

Yan S., et al., "Tiny-Tail flash: Near-Perfect Elimination of Garbage Collection Tail Latencies in NAND SSDs," ACM Transactions on Storage (TOS), 2017, vol. 13, No. 3, pp. 1-26.

* cited by examiner

PERFORMING ERROR CONTROL OPERATION ON MEMORY COMPONENT FOR GARBAGE COLLECTION

RELATED APPLICATION

This application claims the benefit U.S. Provisional Application No. 62/889,280, filed Aug. 20, 2019, the entire contents of which are hereby incorporated by reference herein.

TECHNICAL FIELD

Embodiments of the disclosure relate generally to memory sub-systems, and more specifically, relate to performing error control operation on memory component for garbage collection.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
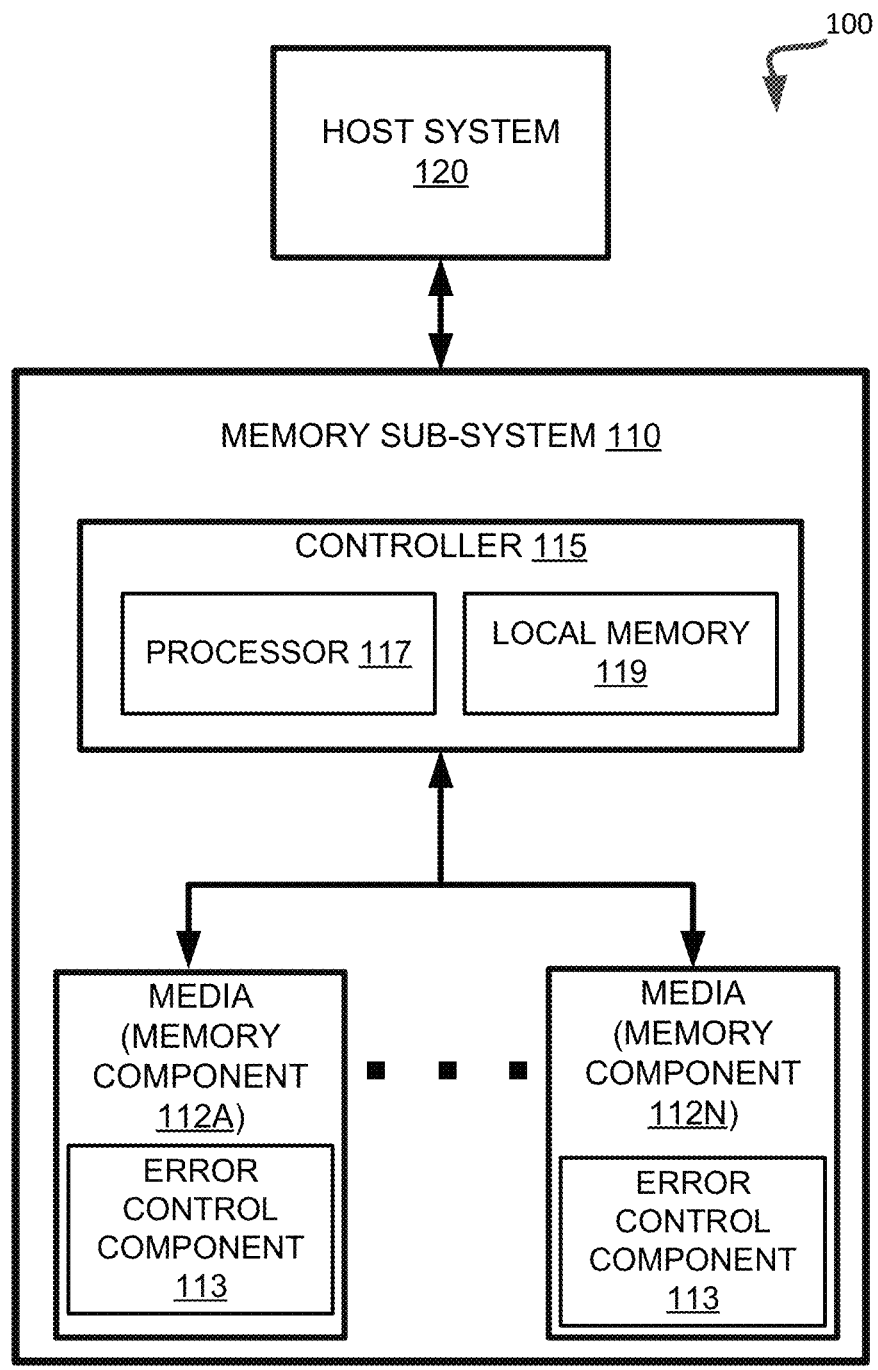
FIG. 1 illustrates an example computing environment that includes a memory sub-system in accordance with some embodiments of the present disclosure.

Aspects of the present disclosure are directed to performing error control operation or error code correction on memory component for garbage collection. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

When the host system requests to store data, the data is stored at a physical address within the memory component. The host system provides a logical address identifying the data to be stored. A logical to physical (L2P) mapping table is maintained to identify the physical location where the data corresponding to each logical address resides. A memory component in a memory sub-system can include one or more memory pages (also referred to herein as "pages") for storing one or more bits of binary data corresponding to data received from the host system. One or more memory pages of the memory component can be grouped together to form a data block. When the data is written to the memory component, it is typically done at the page level, such that an entire page, or multiple pages, is written in a single operation. When the host system requests to update data at a particular logical address, the updated data is stored at a new physical location (e.g., a new physical address) and the L2P mapping is updated so that the particular logical address of the data is mapped to the new physical address. The original data (e.g., the data prior to the update) still remains stored in the original physical address. This data, however, is no longer valid from the host's perspective and is no longer usable by the host. With various changes in data, the memory component accumulates physical addresses across various data blocks that have invalid data, in addition to having physical addresses with valid data. The invalid data stored at the memory component is considered "garbage" and can be cleaned out at some point.

When the memory component is full, such that there is insufficient capacity to accept data from additional write operations, certain data can be erased in order to free up space. When data is erased from the memory component, however, it is typically done at the block level, such that an entire block (including multiple pages) is erased in a single operation. Thus, when a particular segment of data on the memory component is updated, certain pages in a block will have data that has been re-written to a different location and/or is no longer needed. The entire block cannot simply be erased as each block likely also has some number of pages of valid data. A garbage collection process can be performed which involves migrating (e.g., rewriting) those pages of the block that contain valid data to another block, so that the current block with both valid and invalid data can be erased. Garbage collection is a form of automatic memory management that attempts to reclaim garbage, or memory occupied by stale data objects that are no longer in use (e.g., because they have been updated with new values). The basic principle of garbage collection is to find data objects that cannot or need not be accessed in the future, and to reclaim the resources (i.e. storage space) used by those objects.

The memory sub-system can include multiple memory components that can store data from the host system. Data blocks in a memory component are formed from a number of memory cells. Each of the memory cells can store one or more bits of binary data corresponding to the data received from a host system. Data density corresponds to an amount of data (e.g., bits of data) that can be stored per memory cell of a memory component. In one example, a block of the memory system can be configured as single-level-cell (SLC) memory where each memory cell of the SLC memory can be programmed with a single bit of data. When storing one bit of data in the SLC memory, a range of possible voltage levels of a memory cell is divided into two ranges. For example, the two ranges can include a first threshold voltage range that corresponds to the logical data value "1" and a second threshold voltage range that corresponds to the logical data value "0."

Other data blocks in the memory system can be configured as higher density memory, such as multi-level cell (MLC) memory that is programmed by storing two bits per memory cell, three bits per memory cell, four bits per memory cell, or more bits per memory cell. Data can be stored at an MLC memory based on a total voltage range that is divided into some number of distinct threshold voltage ranges for the memory cells. Each distinct threshold voltage range corresponds to a predetermined value for the data stored at the memory cell. For example, some MLC cells can store two bits of data, others referred to triple-level cell (TLC) memory can store three bits of data, while still others referred to as quad-level cell (QLC) memory can store four bits of data. As used herein the term "multi-level cell memory" can include any memory configured to store more than one bit of data per cell.

Despite the smaller capacity and lower density of SLC memory, it still has many benefits including superior performance and reliability compared to MLC/TLC/QLC memory. Read time and program (e.g., write) time for SLC memory is faster than that of MLC memory. The host system can experience less latency in its performance if data from the host system is written to SLC memory. Thus, certain conventional systems configure a fixed portion of the memory as SLC memory (i.e., an SLC cache). These systems operate by initially writing all data associated with any memory write commands received from the host system to data blocks configured as SLC memory and later migrate that data to MLC/TLC/QLC memory.

The internal data migration from one location of the memory sub-system to another location independent of any direct host interaction is known as "folding" or "data compaction." Typically, folding is performed to pack valid data together (e.g., garbage collection), freeing more space for new writes, for error avoidance, for wear leveling (e.g., the process of moving frequently read data to different physical locations to avoid damage to the physical media from frequent read operations), etc. Folding data from SLC memory to MLC memory involves moving data from one granulation (e.g., one bit per cell) to another granulation (e.g., multiple bits per cell). For example, folding data from an SLC memory to TLC memory involves fitting data from three SLC memory cells to one TLC memory cell.

During a data migration (e.g., folding) operation, the memory sub-system can implement an error control ("EC") operation on the data to be migrated, also known in the industry as error code correction or ECC. An error control operation can include error detection and/or error correction operations on the data. For example, an error detection operation on data to be migrated can detect whether there is an error or discrepancy between the stored data and the read data. An error correction operation, for example, can correct the error by performing various data correction steps, such as, performing one or more read retries using different voltage thresholds, etc.

A conventional memory sub-system can include performing the error control operation on the data to be folded using a controller of the memory sub-system that is separate from the memory component. When memory cells have high data density, sophisticated error control capabilities are necessary for correcting data residing on those memory cells and the controller can provide for the necessary capabilities. The controller is typically coupled to the memory components through a data I/O (input/output) bus. In an example, performing EC using a controller involves reading the data from the memory component, transferring the data to the controller using the data bus, performing the EC operation using the controller, waiting for the data bus to be available, transferring the corrected data back to the memory component. In the example when data is migrated from SLC to TLC memory, three SLC pages are read and transferred using the bus to the controller for error controlling, which means as each SLC page is being transferred to or from the controller using the bus, there is wait time for the other SLC pages for the bus to be available. Performing EC on the controller thus involves significant time and power usage. Additionally, while the bus is busy with transferring data for the EC operation on the controller, host commands also experience latency as a result of the wait for the bus. Delay penalty is also incurred while the data bus is used frequently.

Aspects of the present disclosure address the above and other deficiencies by having a memory sub-system that involves folding data from SLC memory to MLC memory and performing the error control operation on the memory component without transferring the data to the controller. The error control operation is feasible on the memory component when the data that is to be migrated is in SLC memory, as opposed to when the data is in MLC memory. For SLC memory, the data density is lower and the read window margin (i.e., the separation between the two voltage threshold distributions is wider than in MLC memory. As such, the EC operation is simpler for data in SLC memory than for data in MLC memory. The expectation for data errors is also lower in SLC memory than MLC memory. Thus, firmware in the memory component itself has the capability to perform the EC operation for data in SLC memory, rather than having to use the controller outside of the memory component.

In one embodiment, a controller in a memory sub-system initiates a garbage collection operation for a data block in a memory component of the memory sub-system where the data block is configured as SLC memory. After the garbage collection is initiated, a firmware in the memory component receives a request to migrate (e.g., fold) data from the data block configured as SLC memory to a data block configured as MLC memory. Since the data to be migrated is in SLC memory, instead of transferring the data back to the controller for performing an error control operation on the data, the firmware on the memory component itself can perform the error control operation (e.g., an error detection operation and/or an error correction operation). Once the error control operation is completed, the firmware can migrate the data to the data block configured as MLC memory.

Advantages of the present disclosure compared to conventional techniques include, but are not limited to, overall increased performance and efficiency of the memory sub-system. As a result of the on-chip error control operation (e.g., error control performed using the memory component), garbage collection and folding operations can be performed more efficiently. Significant power consumption and time performing reading and moving data to the controller and back to the memory component, as well as waiting for I/O bus availability is eliminated. The I/O bus is also freed up for other operations and for host commands.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an error control component 113 that can be used to perform error control operation using a memory component for garbage collection. In some embodiments, error control component 113 can be part of each of the memory components 112A to 112N. For example, memory component 112A can include a processing device (e.g., firmware) configured to execute instructions stored in the memory component 112A for performing the operations described herein. Alternatively, the operations (e.g., error detection and error correction) can be split between the controller 115 of the memory sub-system 110 and the individual memory components 112A-112N of the memory sub-system 110. For example, the controller 115 can include a processor 117 (processing device) configured to execute instructions stored in local memory 119 for performing some of the operations described herein. In some embodiments, the error control component 113 is part of the host system 120, an application, or an operating system.

The error control component 113 can receive a request to migrate data from a data block in memory component 112A configured as SLC memory to a data block configured as MLC memory. The data block configured as MLC memory can be part of any of the memory components 112A to 112N. The error control component 113 can perform an error control operation on the data, the firmware on the memory component performs the error control operation (e.g., an error detection operation and/or an error correction operation) instead of transferring the data back to the controller 115 for performing the error control operation. Once the error control operation is completed, the error control component 113 can migrate the data to the data block configured as MLC memory. Further details with regards to the operations of the characteristic component 113 are described below.

Figure 2:
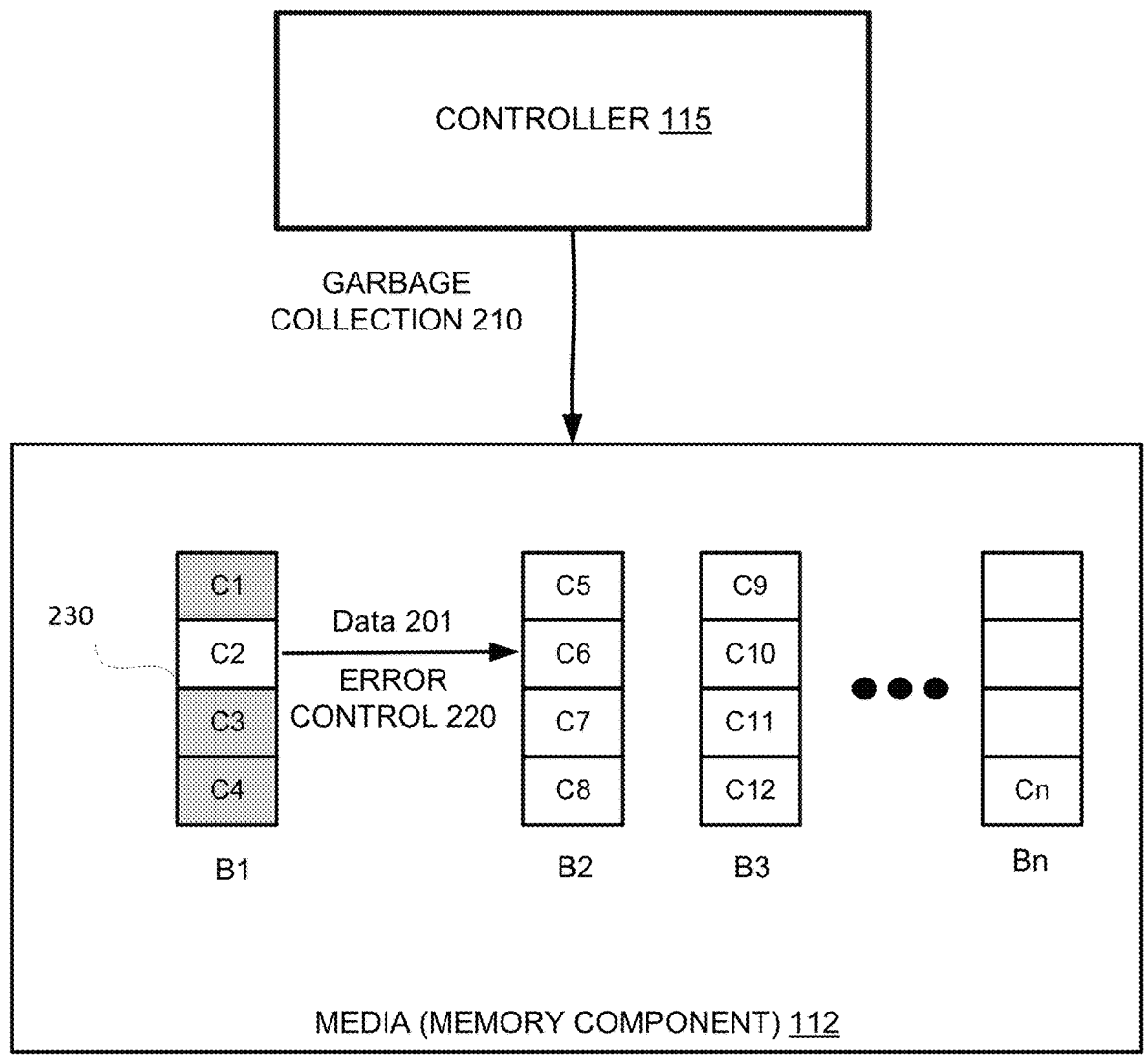
FIG. 2 illustrates an example of performing error control operation on memory component in accordance with some embodiments of the present disclosure.

FIG. 2 illustrates an example of performing error control operation on memory component 112 in accordance with some embodiments of the present disclosure. As shown in the example, memory component 112 can include a number of memory cells (e.g., C1 to Cn). Each of the memory cells can store one or more bits of binary data corresponding to data received from the host system 120. Separate data blocks 230 (e.g., B1, B2, B3 to Bn) in the memory component 112 can be formed by grouping the memory cells together. Certain data blocks can be configured as SLC memory (e.g., B1) where each memory cell (e.g., C1, C2, C3, C4) of the SLC memory is programmed with a single bit of data. Other data blocks are configured as MLC memory (e.g., B2) where each memory cell (e.g., C5, C6, C7, C8) of the MLC memory is programed by storing two bits per memory cell, three bits per memory cell, four bits per memory cell, or more bits per memory cell. In one implementation, memory component 112 is a single memory die including a number of separate data blocks 230. The memory component 112 includes both an SLC portion and a MLC portion of memory cells within the same memory component, as shown in FIG. 2. In another implementation, memory component 112 includes multiple memory die. Each memory die can include one type of memory portion (e.g., SLC only, MLC only) per memory die.

In the example, controller 115 of the memory sub-system 110 of FIG. 1 initiates a garbage collection operation 210 for memory component 112. Controller 115 can determine when it is appropriate to initiate a garbage collection operation. In one embodiment, the garbage collection operation 210 is initiated periodically as part of regular memory management operations for the memory sub-system 110. In another embodiment, the garbage collection process is initiated in response to a particular event, such as, receiving a write request (e.g., from host system 120) and a determination that memory components 112 (e.g., 112A to 112 N of FIG. 1) have insufficient capacity to accept the write request. For example, controller 115 can determine that the memory component 112 is full and/or there is insufficient capacity to accept additional write operations from host 120 and that garbage collection needs to be performed to free up space in the memory component 112. In some examples, controller 115 can determine that memory sub-system 110, or certain components within the memory sub-system 110, is in an idle state or is experiencing downtime. Based on the determination of the appropriate time, controller 115 can initiate the garbage collection operation to erase invalid data from certain blocks.

In response to initiating the garbage collection operation 210, the controller can determine the data block of memory component 112 on which to perform the garbage collection operation 210. Controller 115 can select a data block B1 configured as SLC memory to initiate the garbage collection operation 210 on. For example, some memory cells (e.g., C1, C3 and C4) of data block B1 contain invalid data and some memory cells (e.g., C2) of data block B1 contain valid data. Controller 115 can send a request to memory component 112 (e.g., a firmware within the memory component) to migrate the data (e.g., the valid data) from memory cell C2 to another data block (e.g., B2) in order to perform an erase operation on data block B1. The migration can be performed by reading the data in cell C2 of block B1 and writing the data to another cell (e.g., cell C6) of another data block (e.g., B2). After the migration is completed, the data in block B1 can be erased and memory space in B1 can be reclaimed for storing new data to be received from host 120. The data migration operation can include an error control operation that is to be performed on the data in cell C2.

When the controller 115 selects data block configured as SLC memory, the error control operation can be performed without sending the data over the data bus to the controller 115. A processing device coupled to the memory cells of the memory component 112 can execute firmware to receive the request to migrate the data from the block BI configured as SLC memory to a block B2 configured as MLC memory. Based on the data being in SLC memory, the processing device determines that an error control operation can be performed by the error control component 113 residing within memory component 112. The firmware sends an instruction to error control component 113 to perform error control operation on the data (e.g., data 201) in cell C2. Error control component 113 performs error control operation 220 on data 201. The firmware includes an algorithm to exclude sending the data 201 over the data bus to controller 115 to perform the error control operation 220, as the error control operation is performed by the error control component 113 which resides within memory component 112. In some examples, the firmware includes algorithm to exclude sending data 201 to controller 115 to perform a subset of the error control operation 220. In some examples, the error control operation can be performed prior to sending the data over to the controller for further processing.

In an embodiment, error control operation 220 includes an error detection operation to detect an error associated with the data 201. In some embodiments, the error control operation can further include an error correction operation to correct the detected error based on the error detection operation. In other embodiments, upon detecting the error associated with the data 201 based on the error detection operation, the processing device can transfer the data to the controller 115 for correcting the error. The controller 115 can perform an error correction operation to correct the detected error. The processing device can then receive the corrected data from the controller 115.

Once the error control operation is completed, the firmware can move the data to the data block configured as MLC memory. The data migration can be completed by writing the data 201 (or a corrected version of the data 201) to a memory cell of a data block B2 in the MLC memory. In some example, the data block B2 is part of the same memory component 112 as the data block B1 configured as SLC memory. In other examples, the data block B2 can be part of another memory component that is different from memory component 112 comprising the data block B1 configured as SLC memory. After the migration of the data is completed, existing data from data block B1 can be erased.

Figure 3:
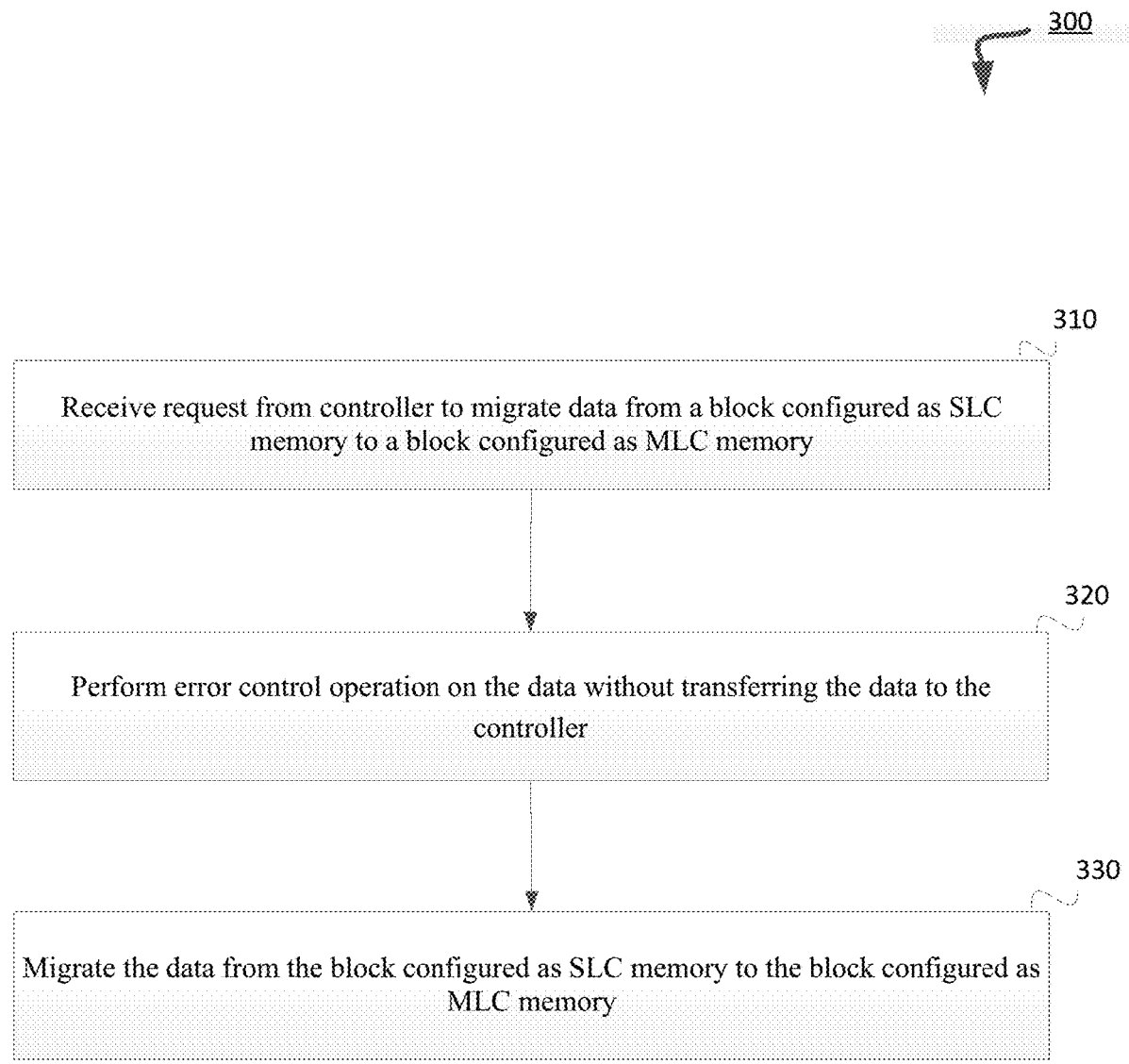
FIG. 3 is a flow diagram of an example method for performing error control operation on memory component for garbage collection, in accordance with some embodiments of the present disclosure.

FIG. 3 is a flow diagram of an example method 300 to perform error control operation on memory component for garbage collection, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 or certain operations of the method 300 is performed by the error control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a request from a controller 115 to migrate data from a block configured as SLC memory to a block configured as MLC memory. The data block configured as SLC memory can include a grouping of one or more memory pages of the memory component 112A. In one example, the data block configured as MLC memory can include a grouping of one or more memory pages of the memory component 112A. In another example, the data block configured as MLC memory can include a grouping of one or more memory pages of the memory component 112N. In one example, the controller 115 resides outside of the memory component 112A and 112N.

At operation 320, the processing logic performs an error control operation on the data without transferring the data to the controller 115. For Example, an error control operation can include an error detection code and/or error correction code. In some examples, error detection and/or error correction codes can include parity bits, hash, Hamming code, Bose-Chaudhuri-Hocquenghem (BCH), or other similar cyclic codes. These codes typically occupy small area but can be limited in their detection and/or correction capabilities and therefore can be better suited for SLC rather than MLC/TLC/QLC. In one example, error control component 113 performs the operation 320. In an example, firmware within the memory component 112A can include error control component 113 for performing the error control operation. The error control operation can be performed entirely by the firmware within the memory component 112A by excluding the steps of transferring the data to the controller 115 for performing the error control operation. This can eliminate time and power usage for reading and transferring the data to the controller 115, wait time for availability of the data bus, and time and power usage for transferring the data back to the memory component 112 from the controller 115.

In one embodiment, the error control operation can include an error detection operation to detect an error associated with the data. In some embodiments, the error control operation can include an error correction operation to correct the detected error based on the error detection operation. In other embodiments, upon detecting the error associated with the data based on the error detection operation, the processing logic can transfer the data to the controller 115 for correcting the error. The controller 115 can perform an error correction operation to correct the detected error. The processing logic can then receive the corrected data from the controller 115.

At operation 330, the processing logic migrates the data from the block configured as SLC memory to the block configured as MLC memory. In an example, migrating the data can include reading the data stored at the block configured as SLC memory and writing the data to the block configured as MLC memory.

In one embodiment, the data is decoded by the on-chip error control component 113, which is lightweight and simple, in addition to the conventional error control component encoded/decoded by the controller 115. In some example, the error control component of the controller 115 can be used for data associated with higher error rates, such as for TLC memory, whereas the on-chip error control component 113 can be used to provide extra functionalities for other simpler error control operations, such as those associated with SLC memory. In some examples, the on-chip error control component can perform the error control operation within the memory component prior to transferring some data to the controller 115 for performance of an error control operation using the error control component of the controller 115.

Figure 4:
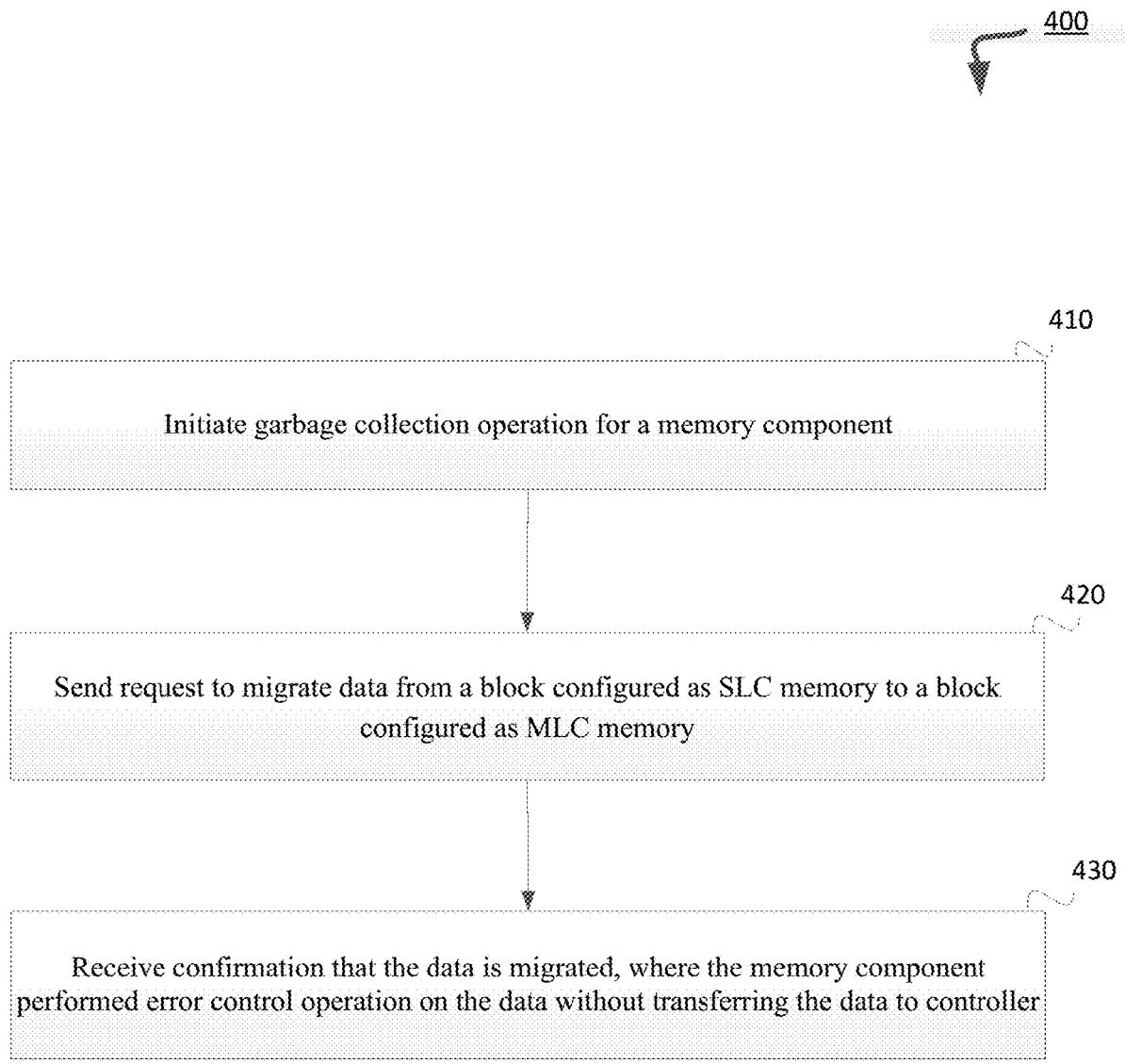
FIG. 4 is a flow diagram of an example method involving performing error control while migrating data from SLC memory to MLC memory, in accordance with some embodiments of the present disclosure.

FIG. 4 is a flow diagram of an example method 400 to perform error control while migrating data from SLC memory to MLC memory, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 or certain operations of method 400 is performed by the controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic initiates a garbage collection operation for memory component 112A. In some embodiment, controller 115 performs the operation 410. Controller 115 can determine when it is appropriate to initiate a garbage collection operation. In some examples, controller 115 can determine that the memory component 112A is full and/or there is insufficient capacity to accept additional write operations from host 120 and that garbage collection needs to be performed to free up space in the memory component 112A. In some examples, controller 115 can determine that memory sub-system 110, or certain components within the memory sub-system 110, is in an idle state or is experiencing downtime. Based on the determination of the appropriate time, controller 115 can initiate the garbage collection operation to erase invalid data from certain blocks. The controller can determine which data block of memory component 112A to perform the garbage collection operation on. In an example, controller 115 can select a data block configured as SLC memory to initiate the garbage collection operation on.

At operation 420, the processing logic sends a request to migrate data from a block configured as SLC memory to a block configured as MLC memory. In some embodiment, controller 115 performs the operation 420. In response to initiating the garbage collection operation, controller 115 can send a request to migrate data from a data block identified for performing garbage collection operation on. Controller 115 can select a first data block configured as SLC memory to migrate data from, as part of the garbage collection operation. Controller 115 can select a second data block configured as MLC memory to migrate the data to. The first data block configured as SLC memory can include a grouping of one or more memory pages of the memory component 112A. In one example, the data block configured as MLC memory can include a grouping of one or more memory pages of the memory component 112A. In another example, the data block configured as MLC memory can include a grouping of one or more memory pages of the memory component 112N. In one example, the controller 115 resides outside of the memory component 112A and 112N.

At operation 430, the processing logic receives a confirmation that the data from the data block is migrated, where a processing device within the memory component performed an error control operation on the data without transferring the data to the controller for performing the error control operation. In some embodiment, controller 115 receives the confirmation from the memory component 112A that the data from the data block has been migrated. In an example, a firmware within the memory component 112A can send the confirmation to the controller 115. The firmware can send the confirmation after performing the error control operation on the data. In one example, the firmware can include error control component 113 for performing the error control operation. After the controller 115 sends the request to the memory component 112A for migration of data, the memory component can perform the error control operation instead of transferring the data back to the controller 115 for the error control operation.

In one embodiment, the error control operation performed using the memory component 112A can include an error detection operation to detect an error associated with the data. In some embodiments, the error control operation can include an error correction operation performed using the memory component 112A to correct the detected error based on the error detection operation. In other embodiments, upon an error associated with the data is detected by the memory component 112A based on the error detection operation, the controller 115 receives the data for performing an error correction operation, the controller 115 performs the error correction operation to correct the error, and the controller 115 transfers the data to the memory component after the error is corrected. Since the expectation to encounter an error is low for SLC pages, the error correction operation is also expected to be performed less frequently for SLC pages. As such, having the memory component 112A perform the error detection operation and sending the data to controller 115 for performing the error correction operation can minimize the overall time spent and power usage associated with performing error control operations for garbage collection. In some examples, the memory component 112A can migrate the data from the first block to the second block by reading the data stored at the first data block and writing the data to the second data block.

Figure 5:
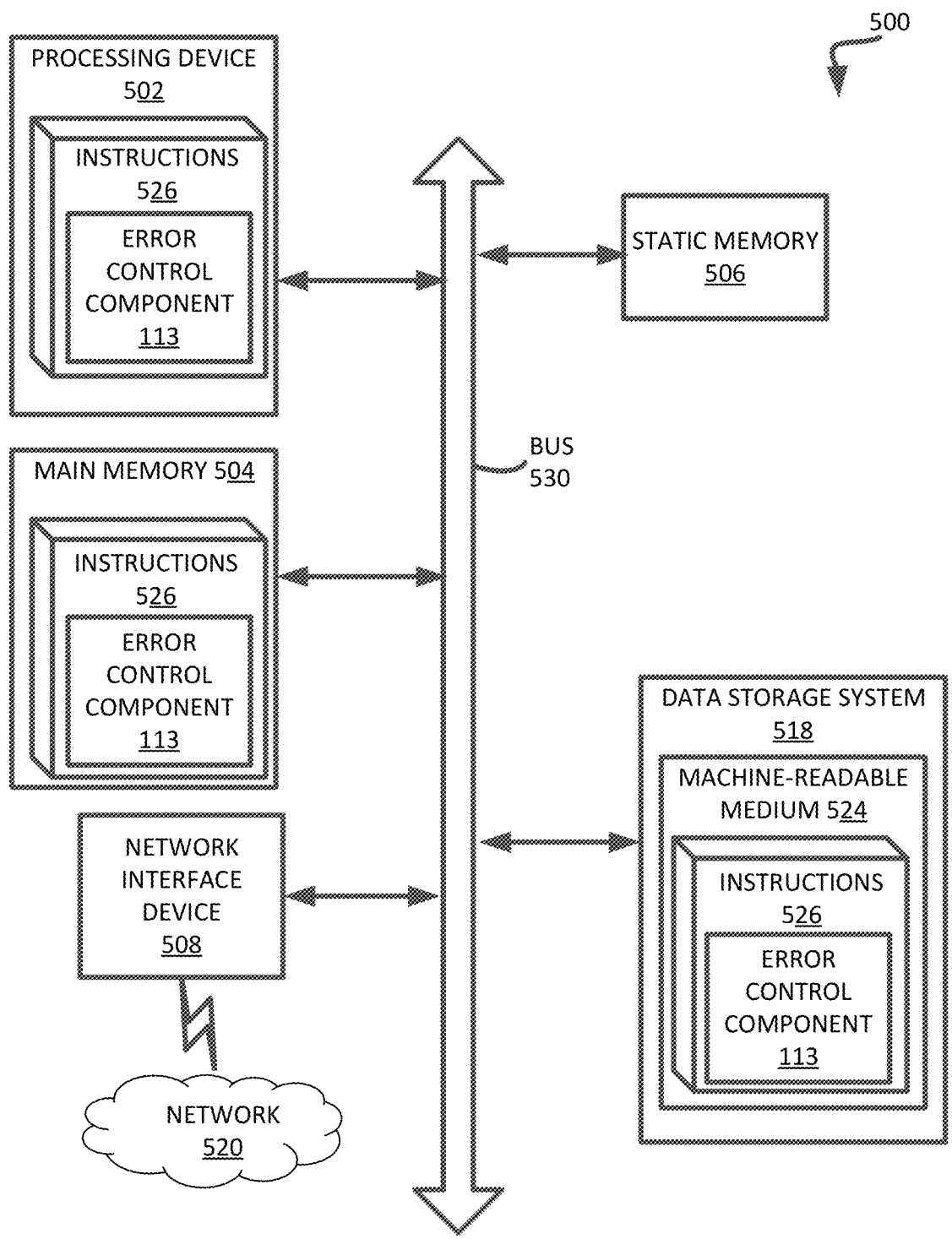
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error control component (e.g., the error control component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory component comprising:
      a plurality of memory cells; and
      a processing device, operatively coupled with the plurality of memory cells, to:
         receive signaling that indicates a request from a controller to migrate data from a first data block of the plurality of memory cells that is single-level-cell (SLC) memory to a second data block that is multi-level-cell (MLC) memory;
         perform an error control operation on the data at the memory component coupled to the controller before migrating the data in response to receiving the signaling; and
         migrate the data from the first data block that is SLC memory to the second data block that is MLC memory in response to performing the error control operation.

2. The system of claim 1, further comprising:
   the controller, wherein the controller resides outside of the memory component.

3. The system of claim 1, wherein the plurality of memory cells comprises the second data block configured as MLC memory.

4. The system of claim 1, wherein to perform the error control operation using the memory component, the processing device is to:
   perform an error detection operation using the memory component.

5. The system of claim 4, the processing device is further to:
  upon detecting an error associated with the data based on the error detection operation, transfer the data to the controller for correcting the error; and
  receive the data from the controller after the error is corrected.

6. The system of claim 1, wherein to perform the error control operation using the memory component, the processing device is to:
  perform an error correction operation using the memory component.

7. The system of claim 1, wherein to migrate the data from the first data block configured as SLC memory to the second data block configured as MLC memory, the processing device is to:
  read the data stored at the first data block; and
  write the data to the second data block.

8. A method comprising:
  initiating, by a controller, a garbage collection operation for a first data block stored on a memory component of a memory sub-system, the garbage collection operation comprising a migration of one or more pages of the first data block that contain valid data to a second data block for management of the first data block;
  sending, in response to initiating the garbage collection operation, first signaling that indicates a request to migrate data from the first data block of the memory component that is single-level-cell (SLC) memory to the second data block that is multi-level-cell (MLC) memory; and
  receiving second signaling that indicates a confirmation that data is migrated, wherein the data migration comprises an error control operation performed within the memory component coupled to the controller prior to migrating the data from the first data block to the second data block and prior to transferring the data to the controller.

9. The method of claim 8, wherein the controller resides outside of the memory component.

10. The method of claim 8, wherein the memory component comprises the second data block configured as MLC memory.

11. The method of claim 8, wherein the error control operation on the data comprises an error detection operation on the data.

12. The method of claim 11, further comprising:
  upon an error associated with the data is detected based on the error detection operation, receiving, by the controller, the data for performing an error correction operation;
  performing the error correction operation to correct the error; and
  transferring the data to the memory component after the error is corrected.

13. The method of claim 8, wherein the error control operation on the data comprises correcting an error associated with the data.

14. The method of claim 8, wherein migrating the data from the first block to the second block comprises the data stored at the first data block being read by the memory component and the data being written to the second data block by the memory component.

15. A non-transitory computer-readable storage medium comprising instructions that, when executed by a processing device comprised within a memory component, cause the processing device to:
  receive signaling that indicates a request from a controller to migrate data from a first data block that is single-level-cell (SLC) memory to a second data block that is multi-level-cell (MLC) memory;
  perform an error control operation on the data at the memory component coupled to the controller before migrating the data in response to receiving the signaling; and
  migrate the data from the first data block that is SLC memory to the second data block that is MLC memory in response to performing the error control operation.

16. The non-transitory computer-readable storage medium of claim 15, wherein to migrate the data from the first data block configured as SLC memory to the second data block configured as MLC memory, the processing device is to:
  read the data stored at the first data block; and
  write the data to the second data block.

17. The non-transitory computer-readable storage medium of claim 15, wherein the controller resides outside of the memory component.

18. The non-transitory computer-readable storage medium of claim 15, wherein the first data block and the second data block are each comprised within the memory component.

19. The non-transitory computer-readable storage medium of claim 15, wherein the error control operation comprises an error detection operation to detect whether the data is associated with an error.

20. The non-transitory computer-readable storage medium of claim 15, wherein the error control operation comprises an error correction operation to correct the data that is associated with an error.

* * * * *